US012238226B2

(12) United States Patent
Natrayan et al.

(10) Patent No.: US 12,238,226 B2
(45) Date of Patent: Feb. 25, 2025

(54) SECURE DISTRIBUTION OF A CLIENT CERTIFICATE PRIVATE KEY TO CLIENT-BASED SERVICES

(71) Applicant: Dell Products L.P., Round Rock, TX (US)

(72) Inventors: Vaneeswaran Natrayan, Tamil Nadu (IN); Mahadev Karadigudda, San Jose, CA (US); Satish Inampudi, San Jose, CA (US); Senthil Ponnuswamy, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 17/862,840

(22) Filed: Jul. 12, 2022

(65) Prior Publication Data

US 2024/0022435 A1 Jan. 18, 2024

(51) Int. Cl.
*H04L 9/32* (2006.01)
*H04L 9/08* (2006.01)

(52) U.S. Cl.
CPC .......... *H04L 9/3268* (2013.01); *H04L 9/0822* (2013.01); *H04L 9/0841* (2013.01); *H04L 9/085* (2013.01)

(58) Field of Classification Search
CPC ... H04L 9/3268; H04L 9/0822; H04L 9/0841; H04L 9/085; H04L 9/14
See application file for complete search history.

(56) References Cited

U.S. PATENT DOCUMENTS

| | | | |
|---|---|---|---|
| 2011/0231923 A1* | 9/2011 | Bollay | H04L 63/0442 726/9 |
| 2016/0344543 A1* | 11/2016 | Alness | H04L 63/06 |
| 2017/0063816 A1* | 3/2017 | Ackerly | H04L 63/0428 |
| 2017/0171219 A1* | 6/2017 | Campagna | H04L 9/0841 |
| 2017/0214662 A1* | 7/2017 | Chu | H04L 9/0869 |
| 2018/0167203 A1* | 6/2018 | Belenko | H04L 9/14 |
| 2019/0372758 A1* | 12/2019 | Tevosyan | H04L 9/0891 |
| 2020/0076582 A1* | 3/2020 | Driever | H04L 63/061 |
| 2020/0177567 A1* | 6/2020 | Ja | H04L 63/20 |
| 2022/0052835 A1* | 2/2022 | Eldefrawy | H04L 9/0825 |
| 2022/0086000 A1* | 3/2022 | Munro | H04L 9/0822 |
| 2022/0263655 A1* | 8/2022 | Murray | H04L 63/0823 |
| 2022/0329442 A1* | 10/2022 | Bulusu | H04L 63/1416 |
| 2023/0130121 A1* | 4/2023 | Peddada | H04L 9/0841 713/171 |

* cited by examiner

*Primary Examiner* — J. Brant Murphy
(74) *Attorney, Agent, or Firm* — Dergosits & Noah LLP; Todd A. Noah (57) ABSTRACT

Described is a system for secure distribution of a client certificate private key to client-based services. The system implements a specialized technique to minimize exposure of a key-encryption-key (KEK) that may be used to secure the client certificate private key that is managed by a certificate manager (CM). A client-based service generates a one-time secret message that is encrypted with the symmetric key and provided to the CM as part of a request to access the private key. The CM authenticates the request originates from a trusted before decrypting the private key with the KEK that remains known only to the CM. The CM then encrypts the decrypted private key with the secret message and provides the client-based service access to private key that is encrypted with the secret message.

20 Claims, 4 Drawing Sheets

SECURE DISTRIBUTION OF A CLIENT CERTIFICATE PRIVATE KEY TO CLIENT-BASED SERVICES

TECHNICAL FIELD

This disclosure relates to managing a certificate private key, and more particularly, minimizing exposure to a key-encryption-key (KEK) when distributing the certificate private key to client-based services.

BACKGROUND

Cloud-based data protection and recovery platforms may provide various tools that are crucial for enterprise level network customers. For example, customers may rely on such platforms to efficiently back up and recover data in the event of user error, data loss, system outages, hardware failure, or other catastrophic events to allow business applications to remain in service or quickly come back up to service. A data protection and recovery platform may act as a client when interacting with another third-party cloud system, or other internal components (or products). For example, the data protection and recovery platform may rely on a third-party cloud storage service to store customer backup data. Accordingly, the data protection and recovery platform may implement various services that interact with the cloud data storage provider via an interface such as a REST API. Thus, these different services (e.g. client-based services) may require access to a single third-party REST server. To establish a secure communication with such a REST server, these various services may require a TLS client certificate associated with the data protection and recovery platform. The client certificate private key may be stored in a secure storage location and typically encrypted with a key-encryption-key (KEK). However, these services may be implemented in different programming languages. Accordingly, exposing the KEK to such services may impose additional security overhead especially as new services are deployed. Moreover, the KEK may be used as a "master" key to secure multiple types of information (e.g. private keys, authentication tokens, private customer data, etc.), so exposure to the KEK presents additional security risks. Thus, there is a continued need to manage access to a client certificate private key by various services in a secure manner.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for secure distribution of a client certificate private key to client-based services. To provide such secure distribution, the system implements a specialized protocol (or process, technique, etc.) that provides additional layers of security when providing client-based services access to a client certificate private key. In particular, the protocol minimizes exposure of a key-encryption-key (KEK) that may be used to secure the private key. The protocol leverages a certificate manager (CM) that manages the distribution of the private key to the various client-based services. The CM and the client-based services may be part of a client system to which the client certificate is issued.

More specifically, the technique involves establishing a secure communication channel between a particular client-based service and the CM by using a symmetric key. The client-based service generates a one-time (or temporary) secret message (e.g. randomly generated hash value) that is encrypted with the symmetric key and provided to the CM as part of a request to access the client certificate private key. The secret message may be client-service-specific (or service-specific) and request-specific. The CM may then verify the request originates from a trusted device. For example, the CM may confirm the request originates from a client-based service that is executing on a localhost. This verification step provides an additional layer of security by ensuring an unauthorized service does not potentially obtain indirect access to the private key. Once the CM verifies the request is from a trusted source, the CM may access the KEK to decrypt the client certificate private key, which may be stored in a secure location. In other words, only the CM reads the KEK, which is not exposed nor shared with any client-based service. As described, client-based services may be developed using different programming languages, which in turn, potentially create security vulnerabilities. Accordingly, management of such vulnerabilities may be minimized by using the CM as an intermediary for private key requests. Continuing with the protocol, the CM may also decrypt the secret message, provided by the client-based service as part of the private key request, with the CM's copy of the symmetric key. The CM now has access to the client certificate private key and the one-time secret message. Accordingly, the CM can encrypt the client certificate private key again with the secret key and provide the client-based service access to the re-encrypted client certificate private key as a response to the initial request. By re-encrypting the client certificate private key with the secret message, the CM can ensure only the particular requesting client-based service can access the client certificate private key. Accordingly, the protocol allows the CM to securely distribute the client certificate private key to various client-based services without exposing the KEK used to secure the client certificate private key.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs. The storage of data can employ any suitable storage technique, infrastructure, or hardware (e.g. Solid State Drive (SSD), Hard Disk Drive (HDD)), which may include virtual storage systems provided by a cloud service provider.

Figure 1:
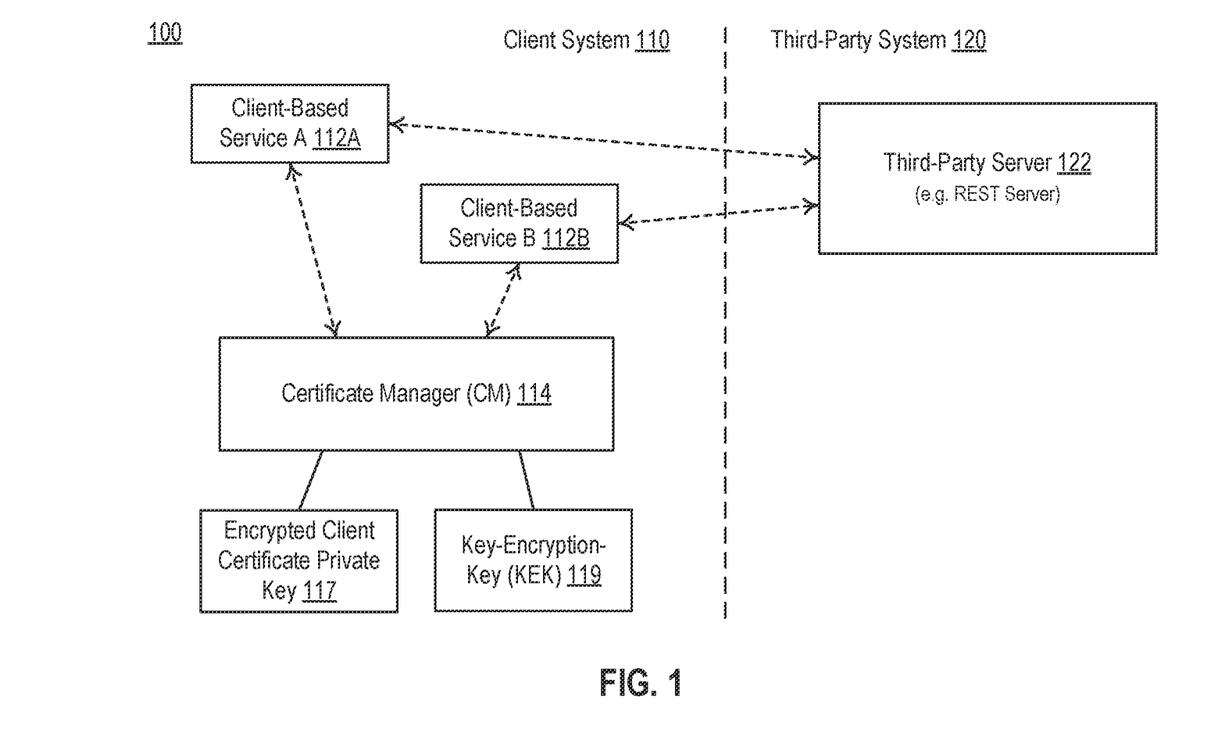
FIG. 1 is a block diagram illustrating an example operating environment for secure distribution of a client certificate private key to client-based services according to one or more embodiments of the disclosure.

More specifically, and with reference to FIG. 1, shown is a block diagram illustrating an example of an operating environment 100 for secure distribution of a client certificate private key to client-based services according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the operating environment 100 may include one or more client-based services 112 (shown as client service 112A and 112B), certificate manager (CM) 114, and a third-party server 122. The client-based services 112 and CM 114 may be part of a client system (or network) 110, and the third-party server 122 (e.g. REST server) may be part of a third-party system (or network) 120. In some embodiments, the client system 110 may be a host or cluster on which one or more processes or services (e.g. services 112) are executing (or running). In some embodiments, the third-party system 120 may be cloud-based data storage provider that provides access to cloud data storage via a REST API provided by a REST Server (e.g. server 122). The client system 110 may be provided by (or belong to) a first entity, and the third-party system 120 may be provided by (or belong to) a second, different, entity. For example, the client system 110 may be provided as part of data protection and recovery service (e.g. software/platform-as-a-service) provided by the first entity (e.g. Dell EMC), and the third-party system 120 may be provided as part of a cloud-based storage service (e.g. software/platform-as-a-service) provided by the second entity (e.g. Amazon S3, Microsoft Azure, IBM Cloud Object Storage, Google Cloud Storage, etc.). Accordingly, the first entity (e.g. client system 110) and the second entity (e.g. third-party system 120) may each have their own respective set of TLS certificates used for authentication. For example, as referred to herein, a client certificate refers to a certificate issued to the client system 110 that is used for authentication and establishing a secure communication between client-based services 112 and the third-party server 122.

Each of client-based service A 112A and client-based service B 112B may establish a secure communication (or channel) with the third-party server 122. To establish such a secure communication, each client-based service 112A and 112B respectively, may use a client certificate private key for authentication as further described herein. To obtain access the client certificate private key, each client-based service 112A and 112B respectively, may initiate a request to the CM 114. As shown, the client-based services 112A and 112B may not have direct access to the encrypted client certificate private key 117, nor the KEK 119 that is required to decrypt the client certificate private key (or certificate private key, or private key). In other words, only the CM 114 can provide the client-based services 112 access to the private key. Accordingly, the client system 110 may manage distribution of the client certificate private key to a particular client-based service 112 as part of a specialized protocol as further described with reference to FIG. 2.

Figure 2:
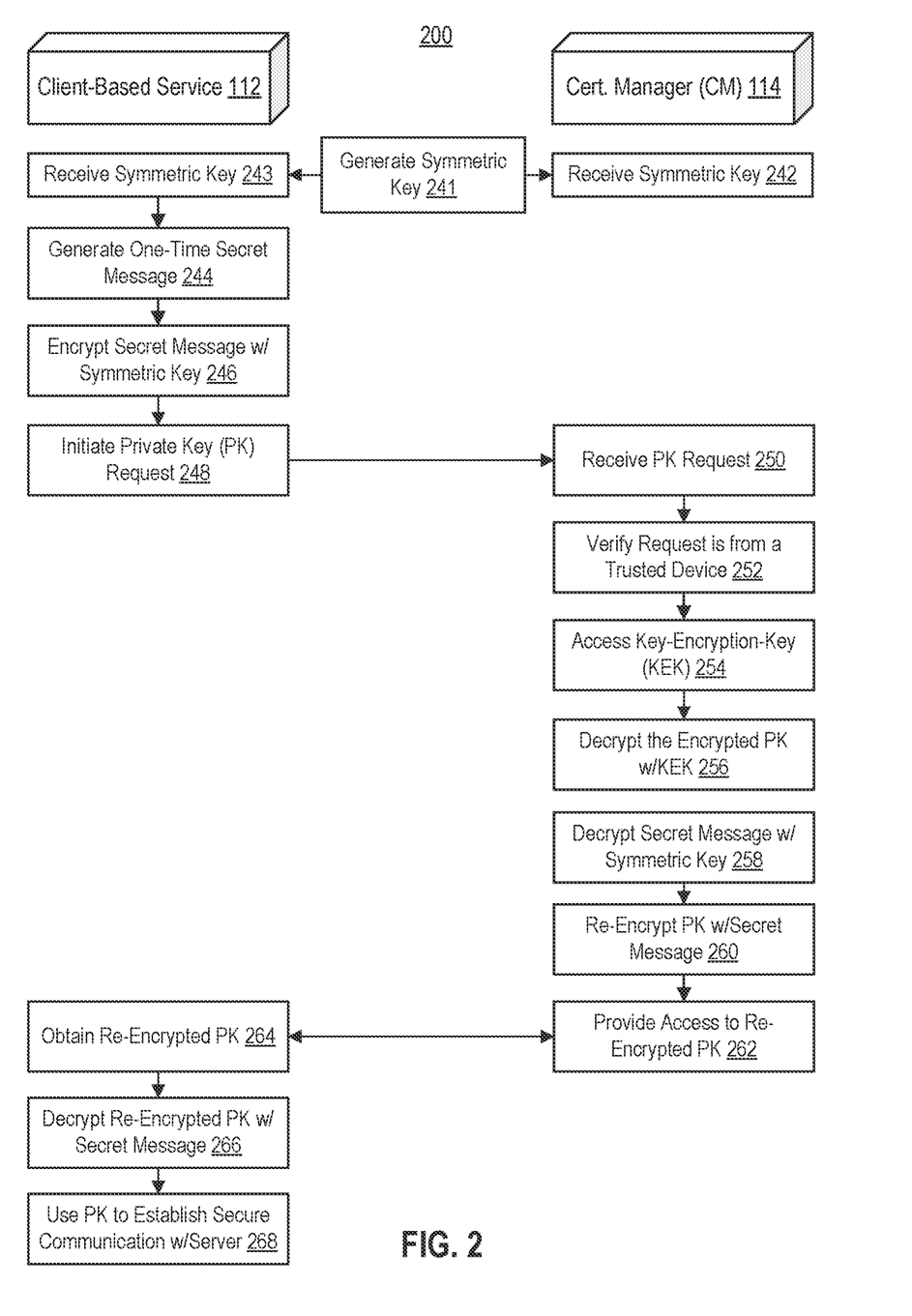
FIG. 2 is a process flow diagram illustrating an example process flow for securely distributing a client certificate private key to a client-based service according to one or more embodiments of the disclosure.

FIG. 2 is a process flow diagram illustrating an example process flow (or protocol) for securely distributing a client certificate private key to a client-based service according to one or more embodiments of the disclosure. Process 200 may use processing logic, which may include software, hardware, or a combination thereof. For example, process 200 may be performed by a system including one or more components described in operating environment 100.

As shown, the process flow 200 described in this embodiment includes an interaction between a client-based service 112 (e.g. client-based service A 112A) and the certificate manager (CM) 114. As described, the client-based service 112 and CM 114 may be part of a client system (or network) 110.

In order to securely distribute the private key, at 241, a symmetric key may be generated. The symmetric key may be generated using any suitable key exchange algorithm (or method, technique, etc.). In some embodiments, a Diffie-Hellman (DH) key exchange algorithm may be used. In response to initiating a symmetric key exchange, the symmetric keys may be received by the CM 114 and the client-based service 112 as shown at 242 and 243 respectively. At 244, the client-based service 112 may generate a one-time secret message (or key, passphrase, code, etc.). The secret message may be "one-time" in that it is only used for a particular request by a particular client-based service to access the private key. In other words, the secret message is service-specific and generated per request or request-specific. The secret message may be generated using any suitable technique. In some embodiments, the secret message may be a randomly generated hash value. The hash value may be generated using any cryptographic hash function. Next, at 246, the client-based service 112 may encrypt the one-time secret message with the symmetric key. At 248, the client-based service 112 may initiate a client certificate private key access request to the CM 114. In some embodiments, the private key may be requested via an API such as a REST API, a remote procedure call (RPC), or any other type of protocol. For example, the request may be in the form of a GET request (or method).

At 250, the CM 114 receives the client certificate private key access request. In response to receiving the request, at 252, the CM 114 may verify the request is received from a trusted device or trusted service. In some embodiments, the CM 114 may verify that the device from which the request originates is a localhost. For example, the CM 114 may verify the device on which the requesting client-based service is executing is a device that is part of the same system (e.g. client system 110). As another example, the CM 114 may verify that the device from which the request originates is within the same local network (e.g. client system 110 network) as the CM 114. As another example, the CM 114 may verify the client-based service is executing within the same operating system instance as the CM 114. As yet another example, the CM 114 may verify the client-based service is executing within the same sandboxed environment as the CM 114. As yet another example, the CM 114 may verify the request originates from a device that is included in an approved or known device list (e.g. whitelisted). For instance, the list may include devices that have been previously verified. It should be noted that the CM may verify whether the device is trusted using a combination of the example techniques described herein. If the CM 114 can verify the request is received from a trusted device, the process proceeds. However, if the verification fails, the CM 114 rejects the request.

After performing the verification (i.e. the device or service is trusted), at 254, the CM 114 may access the KEK (or passphrase) that is required to decrypt the encrypted client certificate private key. For example, the private key may be stored in an encrypted format at a secure location that only the CM 114 may access and/or a location not directly accessible by a client-based service. After accessing (or obtaining) the KEK, at 256, the CM 114 may decrypt the encrypted client certificate private key. In addition, at 258 (which may be performed prior to 256), the CM 114 may decrypt the secret message provided as part of the request from the client-based service with the CM's 114 copy of the symmetric key. Accordingly, now the CM 114 has access to the unencrypted client certificate private key, and the secret message. Thus, in 260, the CM 114 encrypts (e.g., re-encrypts) the client certificate private key with the secret message. This ensures that only the particular client-based service that requested the private key can perform decryption. At 262, the CM 114 may provide the client-based service 112 access to the private key encrypted with the secret message (or re-encrypted private key). Accordingly, at 264, the client-based service 112 may obtain the private key encrypted with the secret message. In some embodiments, the access may in the form of providing the client-based service 112 with the location (e.g. secure location) at which the encrypted private key is saved. In some embodiments, the access may be provided by directly returning the private key encrypted with the secret message (e.g. as a REST response). In some embodiments, the storage location (or path) of the encrypted private key may be provided as the response to the initial request (i.e. request at 248). For example, the client-based service 112 and CM 114 may communicate via a REST API; thus, the storage location (or path) of the encrypted private key may be provided as a response to a GET request. In some embodiments, the storage location (or path) of the encrypted private key may be specified as part of the request (e.g. request header); thus, the CM 114 may use the specified path the store the encrypted private key.

Next, at 266, the client-based service 112 may decrypt the obtained encrypted private key with the secret message. Accordingly, at 268, the client-based service 112 can use the client certificate private key for authentication and establishing a secure communication with a third-party server (e.g. server 122).

Figure 3:
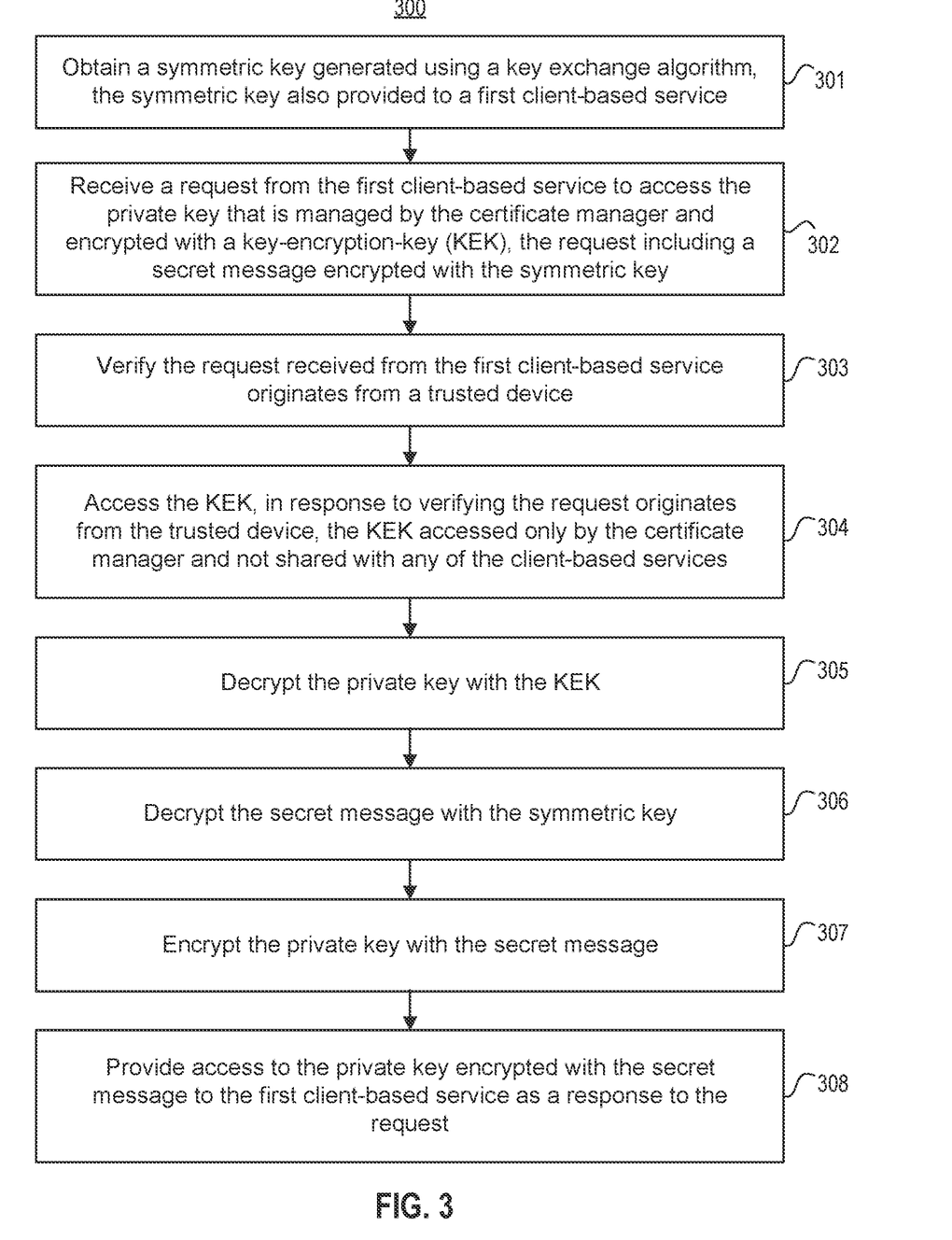
FIG. 3 is a flow diagram illustrating an example method of securely distributing a client certificate private key to one or more client-based services according to one or more embodiments of the disclosure.

FIG. 3 is a flow diagram illustrating an example method of securely distributing a client certificate private key to one or more client-based services according to one or more embodiments of the disclosure. Process 300 may use processing logic, which may include software, hardware, or a combination thereof. For example, process 300 may be performed by a system including one or more components described in operating environment 100.

In 301, the system (e.g. client system 110 and/or CM 114) may obtain a symmetric key generated using a key exchange algorithm. The symmetric key may also be provided to a first client-based service (e.g. client-based service 112A). In some embodiments, the shared key exchange algorithm may be a Diffie-Hellman (DH) key exchange algorithm.

In 302, the system may receive a request from the first client-based service to access the private key that is managed by the certificate manager (e.g. CM 114) and encrypted with a key-encryption-key (KEK) (e.g. KEK 119). The certificate manager and the client-based services may be provided by a client system to which the client certificate is issued.

The request may include a secret message encrypted with the symmetric key. The secret message may be generated by the first client-based service. In some embodiments, the secret message is a one-time message created exclusively for the request to access the private key.

In the 303, the system may verify the request received from the first client-based service originates from a trusted device. In some embodiments, verifying the request originates from a trusted device includes verifying the request originates from a localhost.

In 304, the system may access the KEK, in response to verifying the request originates from the trusted device. The KEK may be accessed only by the certificate manager and not shared with any of the client-based services.

In 305, the system may decrypt the private key with the KEK. In 306, the system may decrypt the secret message with the symmetric key. Thus, in 307, the system may encrypt the private key with the secret message.

In 308, the system may provide access to the private key encrypted with the secret message to the first client-based service as a response to the request.

In some embodiments, the request is received via a REST API as a GET request, and the access to the private key is provided as a path to a storage location of the private key encrypted with the secret message as the response to the GET request. The path may be specified as part of the request. For example, the path may be provided as part of the request header. In some embodiments, access to the private key may be provided by directly returning the private key encrypted with the secret message.

In some embodiments, the system may receive a subsequent request from a second client-based service (e.g. client-based service 112B) to access the private key that is managed by the certificate manager and encrypted with the KEK. The subsequent request may include a different secret message encrypted with a different symmetric key. The different secret message may be generated by the second client-based service. As described, the secret message may be a one-time message created exclusively for the request to access the private key. For example, the different secret message may be request-specific and service-specific.

Accordingly, as described in embodiments, the method allows the client system to securely distribute the client certificate private key to various client-based services without exposing the KEK used to secure the client certificate private key.

Figure 4:
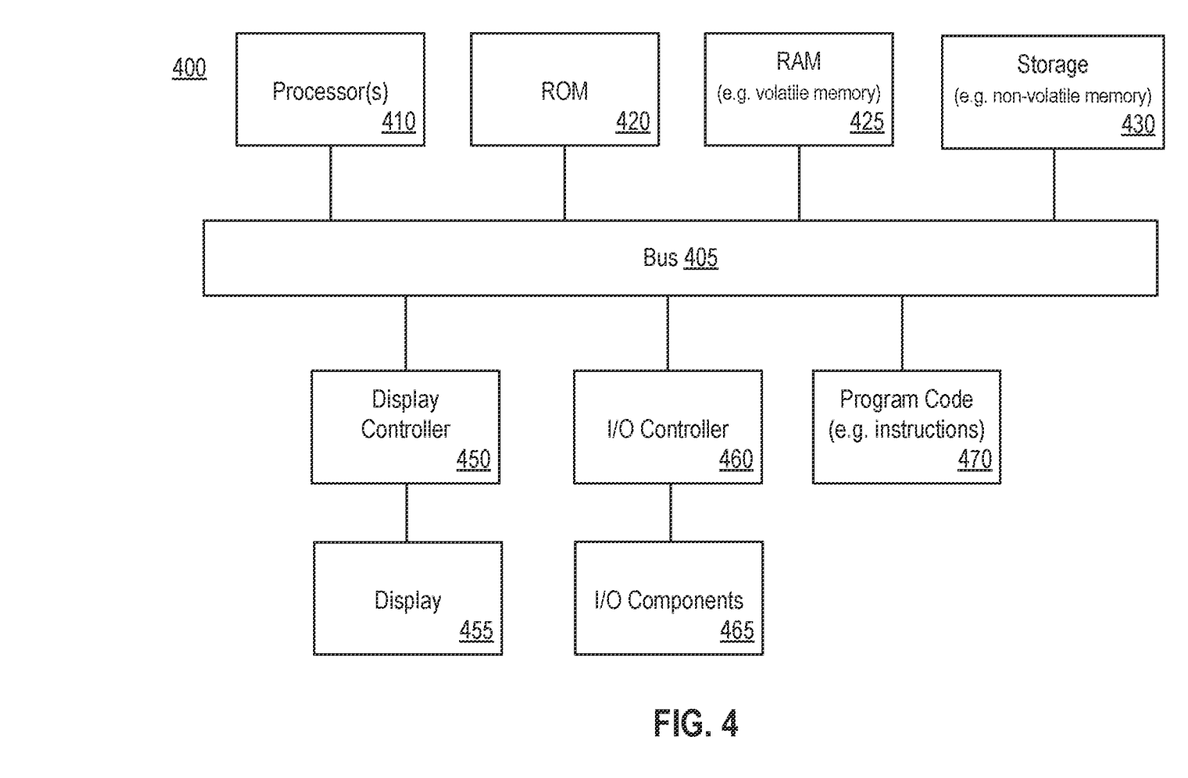
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. client system 110, certificate manager 114, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. client-based service 112, certificate manager 114, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for a client system to securely distribute a client certificate private key to one or more client-based services, comprising:
   one or more processors; and
   a non-transitory computer readable medium storing a plurality of instructions, which when executed, cause the one or more processors to:
   obtain a symmetric key generated using a key exchange algorithm, the symmetric key also provided to a first client-based service;
   receive a request from the first client-based service to access a client certificate private key that is managed by a certificate manager and encrypted with a key-encryption-key, the request including a secret message encrypted with the symmetric key, the secret message generated by the first client-based service;
   verify the request received from the first client-based service originates from a trusted device;
   access the key-encryption key, in response to verifying the request originates from the trusted device, the key-encryption key accessed only by the certificate manager and not shared with any of the client-based services;
   decrypt the client certificate private key with the key-encryption key;
   decrypt the secret message with the symmetric key;
   encrypt the client certificate private key with the secret message; and
   provide access to the client certificate private key encrypted with the secret message to the first client-based service as a response to the request.

2. The system of claim 1, wherein the request is received via a REST API as a GET request, and the access to the client certificate private key is provided as a path to a storage location of the client certificate private key encrypted with the secret message as the response to the GET request.

3. The system of claim 2, wherein the request from the first client-based service includes information that specifies the path to the storage location of the client certificate private key encrypted with the secret message.

4. The system of claim 1, wherein verifying the request originates from a trusted device includes verifying the request originates from a localhost.

5. The system of claim 1, wherein the plurality of instructions, when executed, further cause the one or more processors to: receive a subsequent request from a second client-based service to access the client certificate private key that is managed by the certificate manager and encrypted with the key-encryption key, the subsequent request including a second secret message encrypted with a second symmetric key, the second secret message generated by the second client-based service.

6. The system of claim 1, wherein the certificate manager and the client-based services are provided by a client system to which the client certificate private key is issued.

7. The system of claim 1, wherein the key exchange algorithm includes a Diffie-Hellman (DH) key exchange algorithm.

8. The system of claim 1, wherein the secret message is a one-time message created exclusively for the request to access the client certificate private key.

9. A method for a client system to securely distribute a client certificate private key to one or more client-based services comprising:
   obtaining a symmetric key generated using a key exchange algorithm, the symmetric key also provided to a first client-based service;
   receiving a request from the first client-based service to access a client certificate private key that is managed by a certificate manager and encrypted with a key-encryption-key, the request including a secret message encrypted with the symmetric key, the secret message generated by the first client-based service;
   verifying the request received from the first client-based service originates from a trusted device;
   accessing the key-encryption key, in response to verifying the request originates from the trusted device, the key-encryption key accessed only by the certificate manager and not shared with any of the client-based services;
   decrypting the client certificate private key with the key-encryption key;
   decrypting the secret message with the symmetric key;
   encrypting the client certificate private key with the secret message; and
   providing access to the client certificate private key encrypted with the secret message to the first client-based service as a response to the request.

10. The method of claim 9, wherein the request is received via a REST API as a GET request, and the access to the client certificate private key is provided as a path to a storage location of the client certificate private key encrypted with the secret message as the response to the GET request.

11. The method of claim 9, wherein verifying the request originates from a trusted device includes verifying the request originates from a localhost.

12. The method of claim 9, further comprising: receiving a subsequent request from a second client-based service to access the client certificate private key that is managed by the certificate manager and encrypted with the key-encryption key, the subsequent request including a second secret message encrypted with a second symmetric key, the second secret message generated by the second client-based service.

13. The method of claim 9, wherein the certificate manager and the client-based services are provided by a client system to which the client certificate private key is issued.

14. The method of claim 9, wherein the key exchange algorithm includes a Diffie-Hellman (DH) key exchange algorithm.

15. The method of claim 9, wherein the secret message is a one-time message created exclusively for the request to access the client certificate private key.

16. A computer program product comprising a non-transitory computer-readable medium having a computer-readable program code embodied therein to be executed by one or more processors for a client system to securely distribute a client certificate private key to one or more client-based services, the program code including instructions to:

obtain a symmetric key generated using a key exchange algorithm, the symmetric key also provided to a first client-based service;

receive a request from the first client-based service to access a client certificate private key that is managed by a certificate manager and encrypted with a key-encryption-key, the request including a secret message encrypted with the symmetric key, the secret message generated by the first client-based service;

verify the request received from the first client-based service originates from a trusted device;

access the key-encryption key, in response to verifying the request originates from the trusted device, the key-encryption key, accessed only by the certificate manager and not shared with any of the client-based services;

decrypt the client certificate private key with the key-encryption key;

decrypt the secret message with the symmetric key;

encrypt the client certificate private key with the secret message; and provide access to the client certificate private key encrypted with the secret message to the first client-based service as a response to the request.

17. The computer program product of claim 16, wherein the request is received via a REST API as a GET request, and the access to the client certificate private key is provided as a path to a storage location of the client certificate private key encrypted with the secret message as the response to the GET request.

18. The computer program product of claim 16, wherein verifying the request originates from a trusted device includes verifying the request originates from a localhost.

19. The computer program product of claim 16, wherein the program code includes further instructions to: receive a subsequent request from a second client-based service to access the client certificate private key that is managed by the certificate manager and encrypted with the key-encryption key, the subsequent request including a second secret message encrypted with a second symmetric key, the second secret message generated by the second client-based service.

20. The computer program product of claim 16, wherein the certificate manager and the client-based services are provided by a client system to which the client certificate private key is issued.

\* \* \* \* \*